US012094260B2

(12) United States Patent
Cawse

(10) Patent No.: US 12,094,260 B2
(45) **Date of Patent: *Sep. 17, 2024**

(54) VIN BASED ACCELEROMETER THRESHOLD

(71) Applicant: Geotab Inc., Oakville (CA)

(72) Inventor: Neil Charles Cawse, Oakville (CA)

(73) Assignee: Geotab Inc., Oakville (CA)

( * ) Notice: Subject to any disclaimer, the term of this patent is extended or adjusted under 35 U.S.C. 154(b) by 0 days.

This patent is subject to a terminal disclaimer.

(21) Appl. No.: 18/135,252

(22) Filed: Apr. 17, 2023

(65) Prior Publication Data

US 2023/0377380 A1 Nov. 23, 2023

Related U.S. Application Data

(63) Continuation of application No. 17/207,804, filed on Mar. 22, 2021, now Pat. No. 11,631,285, which is a continuation of application No. 15/530,400, filed on Jan. 11, 2017, now Pat. No. 10,957,124, which is a continuation of application No. 14/544,475, filed on Jan. 12, 2015, now Pat. No. 9,607,444, which is a continuation of application No. 13/507,085, filed on Jun. 4, 2012, now Pat. No. 8,977,426.

(51) Int. Cl.
*G07C 5/00* (2006.01)
*G07C 5/08* (2006.01)

(52) U.S. Cl.
CPC .......... *G07C 5/008* (2013.01); *G07C 5/0808* (2013.01)

(58) Field of Classification Search
CPC .............................. G07C 5/008; G07C 5/0808
USPC ........................................................ 701/29.6
See application file for complete search history.

(56) References Cited

U.S. PATENT DOCUMENTS 3,146,624 A 9/1964 Talbot
5,491,631 A 2/1996 Shirane et al.
5,608,629 A 3/1997 Cuddihy et al.
5,801,619 A 9/1998 Liu et al.
5,809,439 A 9/1998 Damisch
6,076,028 A 6/2000 Donnelly et al.
6,157,892 A 12/2000 Hada et al.
6,185,410 B1 2/2001 Greene
6,223,125 B1 4/2001 Hall
6,246,961 B1 6/2001 Sasaki et al.
6,405,132 B1 6/2002 Breed et al.
6,721,659 B2 4/2004 Stopczynski
6,823,244 B2 * 11/2004 Breed .................... G07C 5/008
701/32.4

(Continued)

FOREIGN PATENT DOCUMENTS

CA 2754159 C 5/2012
CA 2735458 A1 * 9/2012 .......... B60W 30/146

(Continued)

OTHER PUBLICATIONS

U.S. Appl. No. 18/504,481, filed Nov. 8, 2023, Petersen et al.

(Continued)

*Primary Examiner* — Atul Trivedi
(74) *Attorney, Agent, or Firm* — Wolf, Greenfield & Sacks, P.C.

(57) ABSTRACT

A method and apparatus in a vehicular telemetry system for determining accelerometer thresholds based upon decoding a vehicle identification number (VIN).

31 Claims, 9 Drawing Sheets

(56) References Cited

U.S. PATENT DOCUMENTS 7,089,099 B2 8/2006 Shostak et al.
7,123,164 B2 10/2006 Zoladek et al.
7,158,016 B2 1/2007 Cuddihy et al.
7,284,769 B2 * 10/2007 Breed .................... G07C 5/008 180/282
7,421,322 B1 9/2008 Silversmith et al.
7,635,043 B2 * 12/2009 Breed .................... G01F 23/20 180/282
7,656,280 B2 2/2010 Hines et al.
7,716,002 B1 5/2010 Smith et al.
7,725,216 B2 5/2010 Kim
7,786,864 B1 * 8/2010 Shostak .............. B60C 23/0496 340/572.1
7,853,375 B2 12/2010 Tuff
8,024,084 B2 * 9/2011 Breed .................... B60R 21/20 701/31.4
8,032,276 B2 10/2011 Cawse
8,155,841 B2 4/2012 Erb
8,437,903 B2 5/2013 Willard
8,589,015 B2 11/2013 Willis et al.
8,768,560 B2 7/2014 Willis
8,825,271 B2 9/2014 Chen
8,977,426 B2 3/2015 Cawse
9,043,041 B2 5/2015 Willis et al.
9,373,149 B2 6/2016 Abhyanker
9,607,444 B2 3/2017 Cawse
9,650,007 B1 5/2017 Snyder et al.
9,849,852 B1 12/2017 Larner et al.
10,072,933 B1 9/2018 Surpi
10,083,551 B1 9/2018 Schmitt et al.
10,232,847 B2 3/2019 Cordova et al.
10,246,037 B1 4/2019 Shea et al.
10,282,996 B1 5/2019 Buchbut et al.
10,392,013 B2 8/2019 Hakki et al.
10,395,438 B2 8/2019 Jenkins et al.
10,460,534 B1 10/2019 Brandmaier et al.
10,676,084 B2 6/2020 Fujii
10,688,927 B2 6/2020 Lee et al.
10,843,691 B2 11/2020 Stobbe et al.
10,957,124 B2 3/2021 Cawse
10,957,127 B2 3/2021 Cawse
10,994,728 B2 5/2021 Stobbe et al.
11,094,144 B2 * 8/2021 Cawse ................. G07C 5/0808
11,254,306 B2 2/2022 Stobbe et al.
11,378,956 B2 7/2022 Zhang et al.
11,631,285 B2 4/2023 Cawse
11,758,358 B2 9/2023 Stobbe et al.
2003/0149530 A1 8/2003 Stopczynski
2003/0154017 A1 8/2003 Ellis
2003/0158638 A1 8/2003 Yakes et al.
2003/0191568 A1 10/2003 Breed
2004/0036261 A1 2/2004 Breed
2004/0102883 A1 5/2004 Sala et al.
2005/0040937 A1 2/2005 Cuddihy et al.
2006/0220826 A1 10/2006 Rast et al.
2007/0088465 A1 4/2007 Heffington
2008/0086240 A1 * 4/2008 Breed .................... G07C 5/008 701/1
2008/0119966 A1 * 5/2008 Breed .................... G07C 5/085 701/2
2008/0147265 A1 * 6/2008 Breed .................. G07C 5/0808 701/424
2008/0161989 A1 * 7/2008 Breed .................. B60N 2/0244 701/31.4
2008/0284575 A1 * 11/2008 Breed .................... G07C 5/008 701/31.4
2008/0294690 A1 11/2008 McClellan et al.
2009/0043506 A1 * 2/2009 Breed .................... G08G 1/161 701/472
2009/0048750 A1 2/2009 Breed
2009/0051510 A1 2/2009 Follmer et al.
2009/0055044 A1 2/2009 Dienst
2009/0228157 A1 9/2009 Breed
2009/0237226 A1 9/2009 Okita
2009/0256690 A1 10/2009 Golenski
2009/0276115 A1 11/2009 Chen
2010/0033333 A1 2/2010 Victor et al.
2010/0052945 A1 3/2010 Breed
2010/0065344 A1 3/2010 Collings, III
2010/0070107 A1 * 3/2010 Berkobin ............... G07C 5/008 701/1
2010/0141435 A1 6/2010 Breed
2010/0207754 A1 8/2010 Shostak et al.
2010/0228432 A1 9/2010 Smith et al.
2010/0235891 A1 * 9/2010 Oglesbee ............. H04W 4/029 707/610
2010/0256863 A1 10/2010 Nielsen et al.
2010/0268423 A1 * 10/2010 Breed .................... B60N 2/002 701/45
2011/0060496 A1 3/2011 Nielsen et al.
2011/0093162 A1 4/2011 Nielsen et al.
2011/0112717 A1 5/2011 Resner
2011/0130915 A1 6/2011 Wright et al.
2011/0153367 A1 * 6/2011 Amigo ................... G07C 5/008 701/31.4
2011/0202152 A1 8/2011 Barton et al.
2011/0202305 A1 8/2011 Willis et al.
2011/0224865 A1 9/2011 Gordon et al.
2011/0226038 A1 9/2011 Donahoe et al.
2012/0022780 A1 1/2012 Kulik et al.
2012/0071151 A1 3/2012 Abramson et al.
2012/0075095 A1 3/2012 Howard et al.
2012/0077439 A1 3/2012 Howard et al.
2012/0077440 A1 3/2012 Howard et al.
2012/0077441 A1 3/2012 Howard et al.
2012/0078569 A1 3/2012 Doerr et al.
2012/0089299 A1 * 4/2012 Breed ..................... B60C 19/00 701/1
2012/0095674 A1 4/2012 Lee et al.
2012/0101855 A1 4/2012 Collins et al.
2012/0129544 A1 5/2012 Hodis et al.
2012/0224827 A1 9/2012 Tano
2013/0218603 A1 8/2013 Hagelstein et al.
2013/0274955 A1 10/2013 Rosenbaum
2013/0302758 A1 11/2013 Wright
2013/0317693 A1 11/2013 Jefferies et al.
2013/0325250 A1 12/2013 Cawse
2013/0331055 A1 12/2013 McKown et al.
2013/0332004 A1 * 12/2013 Gompert ................. G06F 16/73 701/1
2014/0253308 A1 9/2014 Kanda
2014/0288727 A1 9/2014 Everhart et al.
2015/0025917 A1 * 1/2015 Stempora ........... G02B 27/0093 705/4
2015/0142209 A1 5/2015 Breed
2015/0206357 A1 7/2015 Chen et al.
2015/0206358 A1 7/2015 Chen et al.
2015/0258991 A1 9/2015 Fletcher et al.
2016/0094964 A1 3/2016 Barfield, Jr. et al.
2016/0117868 A1 4/2016 Mitchell et al.
2017/0008517 A1 1/2017 Himi
2017/0053461 A1 2/2017 Pal et al.
2017/0101093 A1 4/2017 Barfield, Jr. et al.
2017/0132856 A1 5/2017 Cawse
2017/0147420 A1 5/2017 Cawse et al.
2017/0149601 A1 5/2017 Cawse et al.
2017/0149602 A1 5/2017 Cawse et al.
2017/0150442 A1 5/2017 Cawse et al.
2017/0201619 A1 7/2017 Cohen et al.
2017/0210323 A1 7/2017 Cordova et al.
2017/0236340 A1 8/2017 Hagan, Jr.
2017/0263120 A1 9/2017 Durie, Jr. et al.
2017/0309092 A1 10/2017 Rosenbaum
2017/0330455 A1 11/2017 Kikuchi et al.
2018/0025235 A1 1/2018 Fridman
2018/0075309 A1 3/2018 Sathyanarayana et al.
2018/0108189 A1 4/2018 Park et al.
2018/0114377 A1 4/2018 Dyeyev
2018/0126938 A1 5/2018 Cordova et al.
2018/0178745 A1 6/2018 Foltin
2018/0188032 A1 7/2018 Ramanandan et al.
2018/0188384 A1 7/2018 Ramanandan et al.
2018/0218549 A1 8/2018 Wahba et al.

(56) References Cited

U.S. PATENT DOCUMENTS

| | | | |
|---|---|---|---|
| 2018/0293446 | A1 | 10/2018 | Becker et al. |
| 2018/0326936 | A1 | 11/2018 | Ghannam et al. |
| 2018/0365772 | A1 | 12/2018 | Thompson et al. |
| 2018/0365999 | A1 | 12/2018 | Wiklinska et al. |
| 2019/0031100 | A1 | 1/2019 | Lee et al. |
| 2019/0100198 | A1 | 4/2019 | Hakki et al. |
| 2019/0102840 | A1 | 4/2019 | Perl et al. |
| 2019/0118751 | A1 | 4/2019 | Ghannam et al. |
| 2019/0122551 | A1 | 4/2019 | Madrigal et al. |
| 2019/0139327 | A1 | 5/2019 | Hay, II |
| 2019/0202448 | A1 | 7/2019 | Pal et al. |
| 2019/0279440 | A1 | 9/2019 | Ricci |
| 2019/0334763 | A1 | 10/2019 | Cawse et al. |
| 2019/0344740 | A1 | 11/2019 | Hakki et al. |
| 2019/0378355 | A1 | 12/2019 | Bruneel, II et al. |
| 2020/0001865 | A1 | 1/2020 | Stobbe et al. |
| 2020/0209873 | A1 | 7/2020 | Chen |
| 2020/0294401 | A1 | 9/2020 | Kerecsen |
| 2020/0334762 | A1 | 10/2020 | Carver et al. |
| 2020/0334928 | A1 | 10/2020 | Bourke et al. |
| 2020/0380799 | A1 | 12/2020 | Cawse |
| 2021/0089572 | A1 | 3/2021 | Lawlor et al. |
| 2021/0166500 | A1 | 6/2021 | Cawse |
| 2021/0279976 | A1 | 9/2021 | Cawse |
| 2021/0300346 | A1 | 9/2021 | Stobbe |
| 2022/0118931 | A1 | 4/2022 | Qi et al. |
| 2022/0161789 | A1 | 5/2022 | Stobbe et al. |
| 2022/0242427 | A1 | 8/2022 | Petersen et al. |
| 2022/0246036 | A1 | 8/2022 | Petersen et al. |

FOREIGN PATENT DOCUMENTS

| | | | | | |
|---|---|---|---|---|---|
| CA | 3008512 | A1 | | 12/2018 | |
| CN | 104062465 | A | | 9/2014 | |
| CN | 104460464 | A | | 3/2015 | |
| CN | 105678218 | A | | 6/2016 | |
| CN | 104376154 | B | | 5/2018 | |
| CN | 108062600 | A | | 5/2018 | |
| CN | 109049006 | A | | 12/2018 | |
| DE | 10 2007 007 848 | A1 | | 6/2008 | |
| DE | 10 2014 225 790 | A1 | | 6/2016 | |
| EP | 1 569 176 | A2 | | 8/2005 | |
| EP | 2 854 112 | A1 | | 4/2015 | |
| EP | 3 171 352 | A2 | | 5/2017 | |
| EP | 3 187 372 | A2 | | 7/2017 | |
| EP | 3 281 846 | A1 | | 2/2018 | |
| EP | 3 786 903 | A1 | | 3/2021 | |
| FR | 2 944 621 | A1 | | 10/2010 | |
| GB | 2 485 971 | A | | 6/2012 | |
| GB | 2 506 365 | A | | 4/2014 | |
| GB | 2 541 668 | A | | 3/2017 | |
| GB | 2 578 647 | A | | 5/2020 | |
| GB | 2602171 | A | * | 6/2022 | ............ G07C 5/008 |
| JP | 2008-073267 | A | | 4/2008 | |
| KR | 10-2016-0088099 | A | | 7/2016 | |
| WO | WO 2000/019239 | A2 | | 4/2000 | |
| WO | WO 2000/052443 | A1 | | 9/2000 | |
| WO | WO-2004106883 | A1 | * | 12/2004 | .......... G01M 17/007 |
| WO | WO 2013/055487 | A1 | | 4/2013 | |
| WO | WO 2013/103569 | A1 | | 7/2013 | |
| WO | WO 2013/105869 | A1 | | 7/2013 | |
| WO | WO 2013/184620 | A1 | | 12/2013 | |
| WO | WO 2014/177891 | A1 | | 11/2014 | |
| WO | WO 2017/136627 | A1 | | 8/2017 | |
| WO | WO 2019/097245 | A1 | | 5/2019 | |
| WO | WO-2019222358 | A1 | * | 11/2019 | ......... G01C 21/3602 |

OTHER PUBLICATIONS

U.S. Appl. No. 18/541,882, filed Dec. 15, 2023, Ellis et al.

Ellis et al., Methods for characterizing a low-impact vehicle collision using high-rate acceleration data. Co-pending U.S. Appl. No. 18/363,340, filed Aug. 1, 2023.

Peterson et al., Methods for Characterizing a Vehicle Collision. Co-pending U.S. Appl. No. 18/504,481, filed Nov. 8, 2023.

Ellis et al., Methods for characterizing a low-impact vehicle collision using high-rate acceleration data. Co-pending U.S. Appl. No. 18/541,882, filed Dec. 15, 2023.

Wang et al., A collision avoidance system with fuzzy danger level detection. 2017 IEEE Intelligent Vehicles Symposium (IV) Jun. 11, 2017:283-8.

Stobbe et al., Characterizing a Vehicle Collision. Co-pending U.S. Appl. No. 17/202,906, filed Mar. 16, 2021.

Stobbe et al., Characterizing a Vehicle Collision. Co-pending U.S. Appl. No. 17/670,007, filed Feb. 11, 2022.

Peterson et al., Systems for Characterizing a Vehicle Collision. Co-pending U.S. Appl. No. 17/404,784, filed Aug. 17, 2021.

Peterson et al., Methods for Characterizing a Vehicle Collision. Co-pending U.S. Appl. No. 17/404,816, filed Aug. 17, 2021.

Spanish Search Report for Spanish Application No. P201830655 mailed Mar. 25, 2019.

Extended European Search Report for European Application No. 19181267.6 dated Nov. 21, 2019.

Extended European Search Report for European Application No. 19193207.8 dated Nov. 12, 2019.

[No Author Listed], 2017 road safety statistics: What is behind the figures? European Commission—Fact Sheet. Apr. 10, 2018. http://europa.eu/rapid/press-release_MEMO-18-2762_en.pdf. [last accessed Dec. 5, 2019]. 5 pages.

[No Author Listed], Ecall in all new cars from Apr. 2018. European Commission, Digital Single Market. Apr. 28, 2015. https://ec.europa.eu/digital-single-market/en/news/ecall-all-new-cars-april-2018. [last accessed Dec. 5, 2019]. 3 pages.

[No Author Listed], Regulation (EU) 2015/758 of the European Parliament and of the Council of Apr. 29, 2015 concerning type-approval requirements for the deployment of the eCall in-vehicle system based on the 112 service and amending Directive 2007/46/EC. Official Journal of the European Union. May 19, 2015. https://eur-lex.europa.eu/legal-content/EN/TXT/?uri=CELEX:32015R0758. [last accessed Dec. 5, 2019]. 17 pages.

[No Author Listed], Statistics—accidents data. European Commission Community database on Accidents on the Roads in Europe (CARE) Report. Dec. 9, 2020:1 page. https://ec.europa.eu/transport/road_safety/specialist/statistics_en [last accessed Dec. 9, 2020].

[No Author Listed], The interoperable eu-wide ecall. European Commission, Mobility and Transport. May 12, 2019. https://ec.europa.eu/transport/themes/its/road/action_plan/ecall_en. [last accessed Dec. 5, 2019]. 6 pages.

[No Author Listed], Traffic Safety Basic Facts 2017. European Commission, European Road Safety Observatory. 2017. https://ec.europa.eu/transport/road_safety/sites/roadsafety/files/pdf/statistics/dacota/bfs2017_main_figures.pdf. [last accessed Dec. 5, 2019]. 21 pages.

Ahmed, Accident Reconstruction with Telematics Data: Quick Guide for Fleet Managers. Geotab. Oct. 20, 2016:1-17.

Aloul et al., ibump: Smartphone application to detect car accidents. Industrial Automation, Information and Communications Technology (IAICT), 2014 International Conference on, IEEE. 2014:52-56.

Altun et al., Human activity recognition using inertial/magnetic sensor units. International workshop on human behavior understanding. Springer, Berlin, Heidelberg. Aug. 22, 2010:38-51.

Apté et al., Data mining with decision trees and decision rules. Future generation computer systems. Nov. 1, 1997;13(2-3):197-210.

Baoli et al., An improved k-nearest neighbor algorithm for text categorization. arXiv preprint cs/0306099. Jun. 16, 2003: 7 pages.

Bayat et al., A study on human activity recognition using accelerometer data from smartphones. Procedia Computer Science. Jan. 1, 2014;34:450-7.

Bebis et al., Feed-forward neural networks. IEEE Potentials. Oct. 1994;13(4):27-31.

Bottou, Large-scale machine learning with stochastic gradient descent. Proceedings of COMPSTAT'2010. Springer. 2010:177-186.

Breiman, Random forests. Machine learning. Oct. 1, 2001;45(1):5-32.

(56) References Cited

OTHER PUBLICATIONS

Broomé, Objectively recognizing human activity in body-worn sensor data with (more or less) deep neural networks. KTH Royal Institute of Technology School of Computer Science and Communication. 2017:64 pages.
Brown et al., Are you ready for the era of 'big data'. McKinsey Quarterly. Oct. 2011;4(1):1-12.
Buscarino et al., Driving assistance using smartdevices. 2014 IEEE International Symposium on Intelligent Control (ISIC) Oct. 8, 2014:838-842.
Chong et al., Traffic accident analysis using machine learning paradigms. Informatica. Jan. 1, 2005;29(1):89-98.
Christ, Convolutional Neural Networks for Classification and Segmentation of Medical Images. Ph.D. thesis, Technische Universität München. 2017:137 pages.
Dimitrakopoulos et al., Intelligent transportation systems. IEEE Vehicular Technology Magazine. Mar. 15, 2010;5(1):77-84.
Errejon et al., Use of artificial neural networks in prostate cancer. Molecular urology. Dec. 1, 2001;5(4):153-8.
Frigge et al., Some implementations of the boxplot. The American Statistician. Feb. 1, 1989;43(1):50-4.
Gentleman et al., Unsupervised machine learning. Bioconductor case studies. Springer, New York, NY. 2008:137-157.
Glorot et al., Understanding the difficulty of training deep feedforward neural networks. Proceedings of the thirteenth international conference on artificial intelligence and statistics Mar. 31, 2010:249-256.
Goetz et al., Extremely randomized trees based brain tumor segmentation. Proceeding of BRATS challenge-MICCAI. May 2014:7 pages.
Gorjestani et al., Impedance control for truck collision avoidance. Proceedings of the 2000 IEEE American Control Conference (ACC). Jun. 28, 2000;3:1519-24.
Gu et al., Recent advances in convolutional neural networks. Pattern Recognition. 2017:38 pages.
Gurney, An introduction to neural networks. CRC press. Aug. 5, 1997:7 pages.
Harms, Terrestrial gravity fluctuations. Living reviews in relativity. Dec. 1, 2015;18(1):1-150.
Hecht-Nielsen, Theory of the backpropagation neural network. Neural networks for perception. Academic Press, Inc. 1992:65-93.
Hinton et al., Deep neural networks for acoustic modeling in speech recognition: The shared views of four research groups. IEEE Signal Processing Magazine, Nov. 2012;29(6):82-97.
Hou et al., A real time vehicle collision detecting and reporting system based on internet of things technology. 2017 3rd IEEE International Conference on Computer and Communications (ICCC). Dec. 13, 2017:1135-1139.
Iandola et al., SqueezeNet: AlexNet-level accuracy with 50x fewer parameters and< 0.5 MB model size. arXiv preprint arXiv:1602.07360. Feb. 24, 2016:1-13.
Ioffe et al., Batch normalization: Accelerating deep network training by reducing internal covariate shift. arXiv preprint arXiv:1502.03167. Feb. 11, 2015:1-11.
Jain et al., Data clustering: 50 years beyond K-means. Pattern recognition letters. Jun. 1, 2010;31(8):651-66.
Jolliffe, Principal component analysis and factor analysis. Principal component analysis. Springer, 1986:111-149.
Júnior et al., Driver behavior profiling: an investigation with different smartphone sensors and machine learning. PLoS one. Apr. 10, 2017;12(4):1-16.
Keller et al., A fuzzy k-nearest neighbor algorithm. IEEE transactions on systems, man, and cybernetics. Jul. 1985(4):580-5.
Keogh et al., Exact indexing of dynamic time warping. Knowledge and information systems. Mar. 1, 2005;7(3):29 pages.
Khorrami et al., Do deep neural networks learn facial action units when doing expression recognition ?. Proceedings of the IEEE International Conference on Computer Vision Workshops 2015:19-27.
Kitchin, The data revolution: Big data, open data, data infrastructures and their consequences. Sage; Aug. 18, 2014:244 pages.
Krizhevsky et al., Imagenet classification with deep convolutional neural networks. Communications of the ACM. Jun. 2017;60(6):84-90.
Larose, k-nearest neighbor algorithm. Discovering knowledge in data: an introduction to data mining. 2005:90-106.
Lecun et al., Backpropagation applied to handwritten zip code recognition. Neural Computation. Dec. 1989;1(4):541-51.
Lee et al., Predictive risk assessment using cooperation concept for collision avoidance of side crash in autonomous lane change systems. 2017 17th International Conference on Control, Automation and Systems (ICCAS). Oct. 18, 2017:47-52.
Li et al., An improved k-nearest neighbor algorithm for text categorization. arXiv preprint cs/0306099. Jun. 16, 2003:7 pages.
Liao, Clustering of time series data—a survey. Pattern recognition. Nov. 1, 2005;38(11):1857-74.
Liaw et al., Classification and regression by randomForest. R news. Dec. 3, 2002;2(3):1-41.
McCulloch et al., A logical calculus of the ideas immanent in nervous activity. The Bulletin of Mathematical Biophysics. Dec. 13, 194;5(4):115-33.
Michalski et al., Machine learning: an artificial intelligence approach. Springer Science & Business Media. 2013. 587 pages.
Naik, Advances in Principal Component Analysis: Research and Development. Springer, 2017:256 pages.
Nair et al., Rectified linear units improve restricted Boltzmann machines. Proceedings of the 27th international conference on machine learning (ICML-10). Jan. 1, 2010:8 pages.
Neter et al., Applied linear statistical models. Chicago: Irwin; Feb. 1996. Fourth Edition. 1432 pages.
Nyamati et al., Intelligent collision avoidance and safety warning system for car driving. 2017 International Conference on Intelligent Computing and Control Systems (ICICCS). Jun. 15, 2017:791-796.
Olah et al., The building blocks of interpretability. Distill. Mar. 6, 2018;3(3):1-22.
Perez et al., The effectiveness of data augmentation in image classification using deep learning. arXiv preprint arXiv:1712.04621. Dec. 13, 2017:8 pages.
Qian et al., Similarity between Euclidean and cosine angle distance for nearest neighbor queries. Proceedings of the 2004 ACM Symposium on Applied Computing, ACM. Mar. 14, 2004:1232-1237.
Rédei, Introduction. In: Encyclopedia of genetics, genomics, proteomics, and informatics. Springer, Dordrecht. 2008:2 pages. https://link.springer.com/referencework/10.1007/978-1-4020-6754-9 [last accessed Dec. 9, 2020].
Rédei, Principal Component Analysis. In: Encyclopedia of genetics, genomics, proteomics, and informatics. Springer, Dordrecht. 2008:672.
Robert, Machine learning, a probabilistic perspective. Chance. Apr. 23, 2014;27(2):62-63.
Rupok et al., MEMS accelerometer based low-cost collision impact analyzer. 2016 IEEE International Conference on Electro Information Technology (EIT). May 19, 2016:0393-0396.
Sakoe et al., Dynamic programming algorithm optimization for spoken word recognition. IEEE transactions on acoustics, speech, and signal processing. Feb. 1978;26(1):43-9.
Salvador et al., FastDTW: Toward accurate dynamic time warping in linear time and space. Intelligent Data Analysis. Jan. 1, 2007;11(5):561-80.
Shalizi, Advanced data analysis from an elementary point of view. Sep. 8, 2019:828 pages.
Shazeer et al., Outrageously large neural networks: The sparsely-gated mixture-of-experts layer. arXiv preprint arXiv:1701.06538. Jan. 23, 2017:1-19.
Smith, Image segmentation scale parameter optimization and land cover classification using the Random Forest algorithm. Journal of Spatial Science. Jun. 1, 2010;55(1):69-79.
Srivastava et al., Dropout: a simple way to prevent neural networks from overfitting. The Journal of Machine Learning Research. Jan. 1, 2014;15(1):1929-58.
Stobbe, Road Accident Prediction and Characterization Using Convolutional Neural Networks. Master's Thesis, Institute for Data Processing Technische Universität München. Jul. 2, 2018:93 pages.

(56) References Cited

OTHER PUBLICATIONS

Sug, The effect of training set size for the performance of neural networks of classification. WSEAS Transactions on Computers. Nov. 1, 2010;9(11):1297-306.
Ten Holt et al., Multi-dimensional dynamic time warping for gesture recognition. Thirteenth annual conference of the Advanced School for Computing and Imaging. Jun. 13, 2007:8 pages.
Thompson, Regression methods in the comparison of accuracy. Analyst. 1982;107(1279):1169-80.
Tomas-Gabarron et al., Vehicular trajectory optimization for cooperative collision avoidance at high speeds. IEEE Transactions on Intelligent Transportation Systems. Jul. 16, 2013;14(4):1930-41.
Virtanen et al., Impacts of an automatic emergency call system on accident consequences. Proceedings of the 18th ICTCT, Workshop Transport telemetric and safety. Finland 2005:1-6.
Voulodimos et al., Deep learning for computer vision: a brief review. Computational intelligence and neuroscience. 2018;2018:1-13.
Wang et al., Improving nearest neighbor rule with a simple adaptive distance measure. Pattern Recognition Letters. Jan. 15, 2007;28(2):207-13.
Werbos, Backpropagation through time: what it does and how to do it. Proceedings of the IEEE. Oct. 1, 1990;78(10):1550-60.
Witten et al., Data Mining: Practical machine learning tools and techniques. Morgan Kaufmann; 2017. Fourth Edition. 646 pages.
Xu et al., Empirical evaluation of rectified activations in convolutional network. arXiv preprint arXiv:1505.00853. Nov. 27, 2015:5 pages.
Yamane, Statistics: an introductory analysis. Harper & Row New York, NY. 1973. Third Edition. 1146 pages.
Yee et al., Mobile vehicle crash detection system. 2018 IEEE International Workshop on Advanced Image Technology (IWAIT). Jan. 7, 2018:1-4.
Yosinski et al., Understanding neural networks through deep visualization. arXiv preprint arXiv:1506.06579. Jun. 22, 2015:1-12.
Zhang et al., A feature selection-based framework for human activity recognition using wearable multimodal sensors. Proceedings of the 6th International Conference on Body Area Networks. ICST (Institute for Computer Sciences, Social-Informatics and Telecommunications Engineering). Nov. 7, 2011:92-98.
Zou et al., Correlation and simple linear regression. Radiology. Jun. 2003:227(3);617-628.
U.S. Appl. No. 17/202,906, filed Mar. 16, 2021, Stobbe et al.
U.S. Appl. No. 17/670,007, filed Feb. 11, 2022, Stobbe et al.
U.S. Appl. No. 17/404,784, filed Aug. 17, 2021, Petersen et al.
U.S. Appl. No. 17/404,816, filed Aug. 17, 2021, Petersen et al.
P201830655, Mar. 25, 2019, Spanish Search Report.
EP19181267.6, Nov. 21, 2019, Extended European Search Report.
EP19193207.8, Nov. 12, 2019, Extended European Search Report.

* cited by examiner

Refine VIN Based Accelerometer Threshold

Establish Accelerometer Threshold Based Upon A Group Of Specific Vehicles

On Board Initiated Request VIN Based Accelerometer Threshold

Remote Initiated Set VIN Based Accelerometer Threshold

VIN BASED ACCELEROMETER THRESHOLD

RELATED APPLICATIONS

This application claims the benefit under 35 U.S.C. § 120 as a continuation of U.S. application Ser. No. 17/207,804, filed Mar. 22, 2021, entitled "VIN Based Accelerometer Threshold," which claims the benefit under 35 U.S.C. § 120 as a continuation of U.S. application Ser. No. 15/530,400, filed Jan. 11, 2017 (now U.S. Pat. No. 10,957,124), entitled "VIN Based Accelerometer Threshold," which claims the benefit under 35 U.S.C. § 120 as a continuation of U.S. application Ser. No. 14/544,475, filed Jan. 12, 2015 (now U.S. Pat. No. 9,607,444), entitled "VIN Based Accelerometer Threshold," which claims the benefit under 35 U.S.C. § 120 as a continuation of U.S. application Ser. No. 13/507,085, filed Jun. 4, 2012 (now U.S. Pat. No. 8,977,426), entitled "VIN Based Accelerometer Threshold." The entire contents of each of these applications is incorporated herein by reference in its entirety.

TECHNICAL FIELD OF THE INVENTION

The present invention generally relates to a method and apparatus for application in vehicular telemetry systems. More specifically, the present invention relates to vehicle identification numbers (VIN) and establishing accelerometer thresholds based upon decoding and analyzing a vehicle identification number.

BACKGROUND OF THE INVENTION

Vehicular Telemetry systems are known in the prior art.

U.S. Pat. No. 6,076,028 to Donnelly et al is directed to an automatic vehicle event detection, characterization and reporting. A processor processes accelerometer data from a vehicle over varying length windows of time to detect and characterize vehicle events such as crashes. The processed data is compared to thresholds to detect and characterize events. Such evens are then reported to a dispatch center using wireless communications and providing vehicle location information. The dispatch center contacts the public safety answering points necessary to provide services to the vehicle.

U.S. Pat. No. 6,185,490 to Ferguson is directed to a vehicle crash data recorder. A vehicle data recorder useful in recording and accessing data from a vehicle accident comprised of a microprocessor based system that will have in a preferred embodiment four inputs from the host vehicle, and four inputs from the internal sensors. The apparatus is arranged with a three-stage memory to record and retain the information and is equipped with a series and parallel connectors to provide instant on scene access to the accident data. This invention includes a plurality of internally mounted devices necessary to determine vehicle direction, rollover detection, and impact forces. The plurality of inputs from the host vehicle include in the preferred embodiment, the speed of the vehicle, seat belt use, brake activation, and whether or not the transmission is in forward or reverse gear.

U.S. Pat. No. 7,158,016 to Cuddihy et al is directed to a crash notification system for an automotive vehicle. The system is used to communicate with a communication network and ultimately to a response center. The system within vehicle includes an occupant sensor that generates an occupant sensor status signal. A crash sensor, vehicle identification number memory, or a vertical acceleration sensor may also be used to provide information to the controller. The controller generates a communication signal that corresponds to the occupant sensor status signal and the other information so that appropriate emergency personnel may be deployed.

SUMMARY OF THE INVENTION

The present invention is directed to aspects in a vehicular telemetry system and provides a new capability for establishing accelerometer thresholds.

According to a first broad aspect of the invention, there is a method of determining a VIN based accelerometer threshold for a vehicular telemetry system. The method includes the steps of receiving a VIN, decoding the VIN to identify vehicle components, and determining the accelerometer threshold based upon the vehicle components.

The method may also include the step of analyzing the vehicle component. In an embodiment of the invention, decoding the VIN decodes a first group. In another embodiment of the invention, decoding the VIN decodes a second group. In another embodiment of the invention, the first group includes at least one vehicle component of a platform, model, body style, or engine type. In another embodiment of the invention, a weight is associated with each of the at least one component. In another embodiment of the invention, an accelerometer threshold is associated with a sum of weight of all components. In another embodiment of the invention, the second group includes at least one component of installed options, engine, or transmission. In another embodiment of the invention, a weight is associated with at least one component. In another embodiment of the invention, an accelerometer threshold is associated with a sum of weight of all components. The method may further include the step of saving a digital record of the VIN and the VIN based accelerometer threshold. The method may further include the step of providing the VIN based accelerometer threshold from the digital record upon request. In another embodiment of the invention, the analyzing vehicle component associates a weight with each of the vehicle components. In another embodiment of the invention, sensitivity is associated with a sum of weight of the vehicle components. In another embodiment of the invention the VIN based accelerometer threshold is determined based upon a sum of weight of the vehicle components. In another embodiment of the invention, if the accelerometer is over reading or under reading for a VIN, refine the VIN based accelerometer threshold and update the digital record of the VIN with a refined VIN based accelerometer threshold.

According to a second broad aspect of the invention, there is a method of setting a VIN based accelerometer threshold in a vehicular telemetry system. The method includes the steps of receiving a VIN, if a VIN based accelerometer threshold is available for the VIN, set the VIN based accelerometer threshold in the vehicular telemetry system. If a VIN based accelerometer threshold is not available for the VIN, set the VIN based accelerometer threshold by decoding the VIN.

In an embodiment of the invention, decoding the VIN includes determining vehicle components from the VIN and determining a weight of the vehicle components. In another embodiment of the invention, the VIN based accelerometer threshold is determined by a sum of weight of the vehicle components. In another embodiment of the invention, the vehicle components include a first group. In another embodiment of the invention, the vehicle components include a second group. In another embodiment of the invention, the Vin based accelerometer threshold includes a range of weight of the vehicle components.

According to a third broad aspect of the invention, there is an apparatus for setting a VIN based accelerometer threshold in a vehicular telemetry system including a microprocessor, memory, and accelerometer, and an interface to a vehicle network communication bus. The microprocessor for communication with the accelerometer and for communication with the interface to the vehicle network communication bus. The microprocessor and memory for receiving a VIN from the interface to the vehicle network communication bus. The microprocessor and memory determining if a VIN based accelerometer threshold is available for the VIN and capable of setting the VIN based accelerometer threshold. The microprocessor and memory determining if a VIN based accelerometer threshold is not available for the VIN and setting the VIN based accelerometer threshold by decoding the VIN.

In an embodiment of the invention, the microprocessor and memory capable for decoding the VIN into vehicle components. In another embodiment of the invention, the microprocessor and memory further capable for determining a weight of the vehicle components. In another embodiment of the invention, the microprocessor and memory further capable for determining the VIN based accelerometer threshold based upon a weight of the vehicle components. In an embodiment of the invention, the microprocessor and memory further capable for determining the VIN based accelerometer threshold based upon a range of weight of the vehicle components. In another embodiment of the invention, the interface to the vehicle network communication bus is an electronic interface, for example a cable. In an embodiment of the invention, the interface to a vehicle network communication bus is a telecommunication signal interface, for example Wi-Fi or Bluetooth.

According to a fourth broad aspect of the invention, there is a method of setting a VIN based accelerometer threshold in a vehicular telemetry system. The method includes the steps of receiving VIN data in a vehicular system, creating a first message in the vehicular system and sending the first message to a remote system requesting an accelerometer threshold with the VIN data. Receiving in a remote system the first message requesting an accelerometer threshold with the VIN data. Creating a second message in the remote system and sending the second message providing the VIN based accelerometer threshold based upon the VIN data to the vehicular system. Receiving the second message providing the VIN based accelerometer threshold in the vehicular system and setting the accelerometer threshold.

In an embodiment of the invention, the remote system determines from a digital record if a VIN based accelerometer threshold is available for the VIN data. In another embodiment of the invention, the remote system determines a VIN based accelerometer threshold by decoding the VIN data. In another embodiment of the invention, decoding the VIN data determines vehicle components from the VIN data. In another embodiment of the invention, the vehicle components are associated with weight. In another embodiment of the invention, the VIN based accelerometer threshold is determined based upon a weight of the vehicle components. In another embodiment of the invention, the remote system determines a VIN base accelerometer threshold from a digital record.

According to a fifth broad aspect of the invention, there is an apparatus for setting a VIN based accelerometer threshold in a vehicular telemetry system including a vehicular system and a remote system. The vehicular system for receiving VIN data, the vehicular system for creating a first message and sending the first message to the remote system requesting an accelerometer threshold with the VIN data. The remote system for receiving the first message requesting an accelerometer threshold with the VIN data, the remote system for creating a second message providing the VIN based accelerometer threshold based upon the VIN data and sending the second message to the vehicular system and the vehicular system for receiving the second message providing the VIN based accelerometer threshold in the vehicular system and setting the accelerometer threshold.

In an embodiment of the invention, the remote system determines a VIN based accelerometer threshold by decoding the VIN data. In another embodiment of the invention, the remote system determines a VIN based accelerometer threshold by decoding the VIN data into groups. In another embodiment of the invention, the decoding the VIN data determines vehicular components from the VIN data. In another embodiment of the invention, the vehicle components are associated with weight. In another embodiment of the invention, the VIN based accelerometer threshold is determined based upon a sum of weight of the vehicle components. In another embodiment of the invention, the remote system determines a VIN based accelerometer threshold from a digital record. In another embodiment of the invention, the remote system is a server. In another embodiment of the invention, the remote system is a computer. In another embodiment of the invention, the remote system is a hand held device.

According to a sixth broad aspect of the invention, there is a method of setting a VIN based accelerometer threshold in a vehicular telemetry system. The method includes the steps of creating a first message in a remote system and sending the first message to a vehicular system requesting VIN data. Receiving the first message in the vehicular system, the vehicular system obtaining VIN data, creating and sending a second message with VIN data to the remote system. Receiving the second message with the VIN data in the remote system, creating a third message in the remote system and sending the third message to the vehicular system with the VIN based accelerometer threshold. Receiving the third message with the VIN based accelerometer threshold in the vehicular system setting the accelerometer threshold in the vehicular system.

The method may include the step of determining in the remote system if a VIN based accelerometer threshold is available for the VIN data. The method may include the step of determining in the remote system a VIN based accelerometer threshold by decoding the VIN data. In an embodiment of the invention, decoding the VIN data determines vehicle components from the VIN data. In another embodiment of the invention, the vehicle components area associated with weight. In another embodiment of the invention, the VIN based accelerometer threshold is determined based upon a sum of weight of the vehicle components. The method may include the step of determining in the remote system a VIN based accelerometer threshold from a digital record.

According to a seventh broad aspect of the invention, there is an apparatus for setting a VIN based accelerometer threshold in a vehicular telemetry system including a vehicular system and a remote system. The remote system for creating a first message and sending the first message to the vehicular system requesting VIN data. The vehicular system receiving the first message, the vehicular system obtaining VIN data for creating and sending a second message with VIN data to the remote system. The remote system for receiving the second message with VIN data fore creating a third message and sending the third message to the vehicular system with the VIN based accelerometer threshold. The vehicular system for receiving the third message with the VIN based accelerometer threshold and the vehicular system setting the accelerometer threshold.

In an embodiment of the invention, the remote system further determines if a VIN based accelerometer threshold is available for the VIN data. In another embodiment of the invention, the remote system further determines a VIN based accelerometer threshold by decoding the VIN data. In another embodiment of the invention, the remote system determines vehicle components from the VIN data. In another embodiment of the invention, the vehicle components area associated with weight. In another embodiment of the invention, the VIN based accelerometer threshold is determined based upon a weight of the vehicle components. In another embodiment of the invention, the remote system further determines a VIN based accelerometer threshold from a digital record.

These and other aspects and features of non-limiting embodiments are apparent to those skilled in the art upon review of the following detailed description of the non-limiting embodiments and the accompanying drawings.

BRIEF DESCRIPTION OF THE DRAWINGS

Exemplary non-limiting embodiments of the present invention are described with reference to the accompanying drawings in which.

The drawings are not necessarily to scale and may be diagrammatic representations of the exemplary non-limiting embodiments of the present invention.

DETAILED DESCRIPTION

Telematic Communication System

Figure 1:
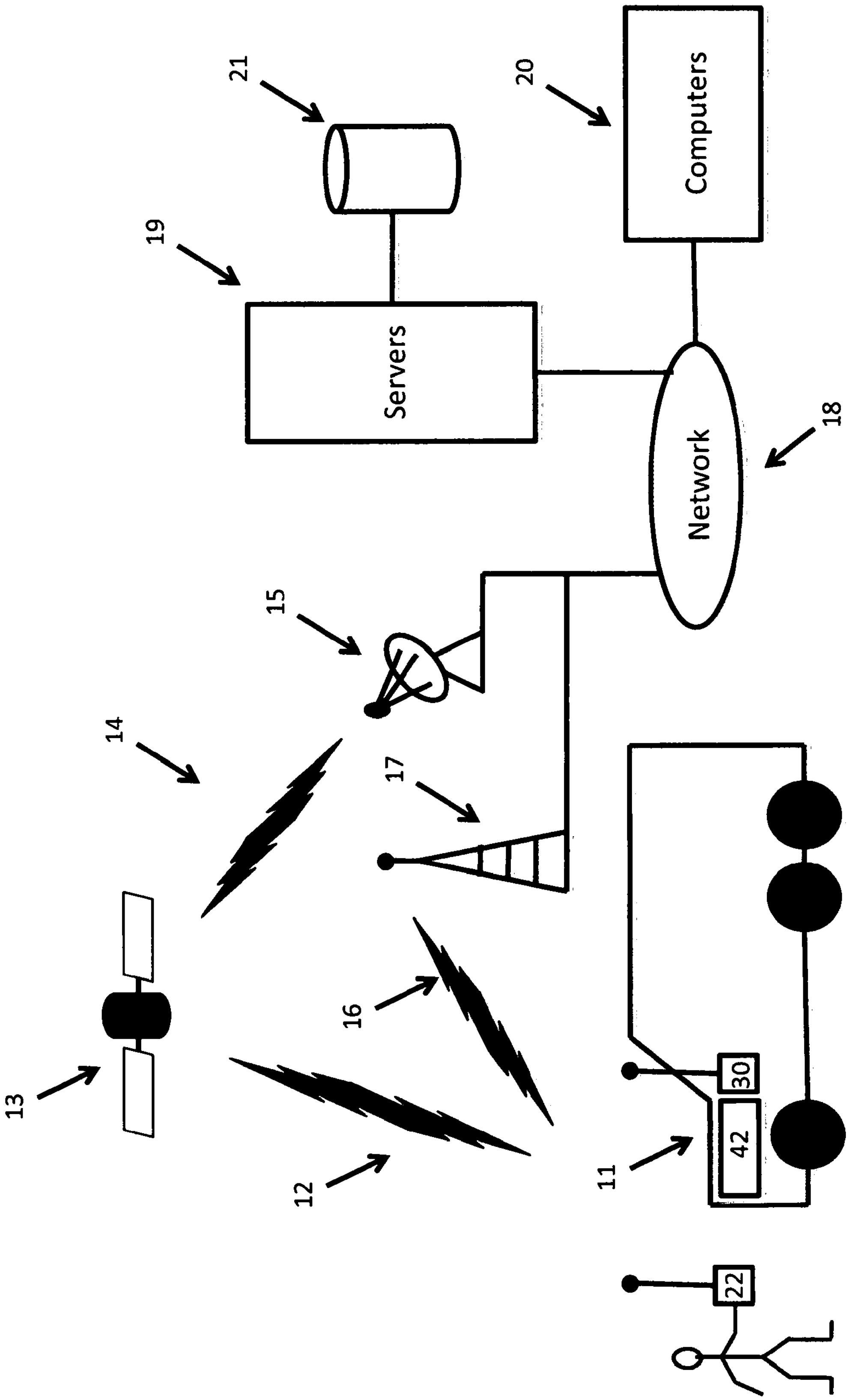
FIG. 1 is a high level diagrammatic view of a vehicular telemetry communication system.

Referring to FIG. 1 of the drawings, there is illustrated a high level overview of a telematic communication system. There is at least one vehicle generally indicated at 11. The vehicle 11 includes a vehicular telemetry hardware system 30 and a resident vehicle portion 42.

The telematic communication system provides communication and exchange of data, information, commands, and messages between components in the system such as at least one server 19, at least one computer 20, at least one hand held device 22, and at least one vehicle 11.

In one example, the communication 12 is to/from a satellite 13. The vehicle 11, or hand held device 22 communicates with the satellite 13 that communicates with a ground-based station 15 that communicates with a computer network 18. In an embodiment of the invention, the vehicular telemetry hardware system 30 and the remote site 44 facilitates communication 12 to/from the satellite 13.

In another example, the communication 16 is to/from a cellular network 17. The vehicle 11, or hand held device 22 communicates with the cellular network 17 connected to a computer network 18. In an embodiment of the invention, communication 16 to/from the cellular network 17 is facilitated by the vehicular telemetry hardware system 30 and the remote site 44.

Computer 20 and server 19 communicate over the computer network 18. The server 19 may include a database 21 of vehicle identification numbers and VIN based accelerometer thresholds associated with the vehicle identification numbers. In an embodiment of the invention, a telematic application software runs on a server 19. Clients operating a computer 20 communicate with the application software running on the server 19.

In an embodiment of the invention, data, information, commands, and messages may be sent from the vehicular telemetry hardware system 30 to the cellular network 17, to the computer network 18, and to the servers 19. Computers 20 may access the data and information on the servers 19. Alternatively, data, information, commands, and messages may be sent from the servers 19, to the network 18, to the cellular network 17, and to the vehicular telemetry hardware system 30.

In another embodiment of the invention, data, information, commands, and messages may be sent from vehicular telemetry hardware system to the satellite 13, the ground based station 15, the computer network 18, and to the servers 19. Computers 20 may access data and information on the servers 19. In another embodiment of the invention, data, information, commands, and messages may be sent from the servers 19, to the computer network 18, the ground based station 15, the satellite 13, and to a vehicular telemetry hardware system.

Data, information, commands, and messages may also be exchanged through the telematics communication system and a hand held device 22.

Vehicular Telemetry Hardware System

Figure 2:
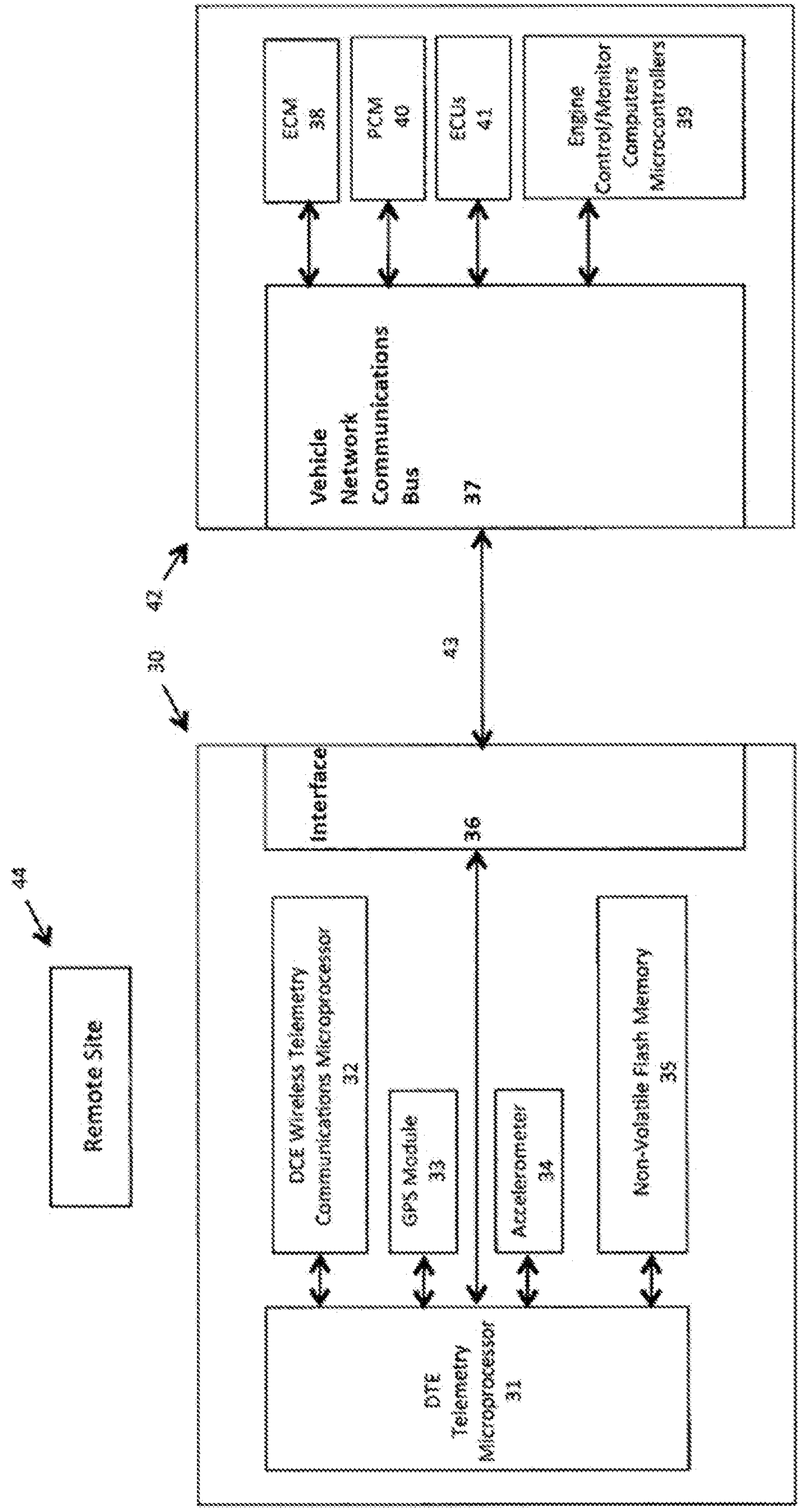
FIG. 2 is diagrammatic view of an vehicular telemetry hardware system including an on-board portion and a resident vehicular portion.

Referring now to FIG. 2 of the drawings, there is illustrated a vehicular telemetry hardware system generally indicated at 30. The on-board portion generally includes: a DTE (data terminal equipment) telemetry microprocessor 31; a DCE (data communications equipment) wireless telemetry communications microprocessor 32; a GPS (global positioning system) module 33; an accelerometer 34; a non-volatile flash memory 35; and provision for an OBD (on board diagnostics) interface 36 for connection 43 and communicating with a vehicle network communications bus 37.

The resident vehicular portion 42 generally includes: the vehicle network communications bus 37; the ECM (electronic control module) 38; the PCM (power train control module) 40; the ECUs (electronic control units) 41; and other engine control/monitor computers and microcontrollers 39.

While the system is described as having an on-board portion 30 and a resident vehicular portion 42, it is also understood that the present invention could be a complete resident vehicular system or a complete on-board system. In addition, in an embodiment of the invention, a vehicular telemetry system includes a vehicular system and a remote system. The vehicular system is the vehicular telemetry hardware system 30. The vehicular telemetry hardware system 30 is the on-board portion 30 and may also include the resident vehicular portion 42. In further embodiments of the invention the remote system may be one or all of the server 19, computer 20, and hand held device 22.

In an embodiment of the invention, the DTE telemetry microprocessor 31 includes an amount of internal flash memory for storing firmware to operate and control the overall system 30. In addition, the microprocessor 31 and firmware log data, format messages, receive messages, and convert or reformat messages. In an embodiment of the invention, an example of a DTE telemetry microprocessor 31 is a PIC24H microcontroller commercially available from Microchip Corporation.

The DTE telemetry microprocessor 31 is interconnected with an external non-volatile flash memory 35. In an embodiment of the invention, an example of the flash memory 35 is a 32 MB non-volatile flash memory store commercially available from Atmel Corporation. The flash memory 35 of the present invention is used for data logging.

The DTE telemetry microprocessor 31 is further interconnected for communication to the GPS module 33. In an embodiment of the invention, an example of the GPS module 33 is a Neo-5 commercially available from u-blox Corporation. The Neo-5 provides GPS receiver capability and functionality to the vehicular telemetry hardware system 30.

The DTE telemetry microprocessor is further interconnected with the OBD interface 36 for communication with the vehicle network communications bus 37. The vehicle network communications bus 37 in turn connects for communication with the ECM 38, the engine control/monitor computers and microcontrollers 39, the PCM 40, and the ECU 41.

The DTE telemetry microprocessor has the ability through the OBD interface 36 when connected to the vehicle network communications bus 37 to monitor and receive vehicle data and information from the resident vehicular system components for further processing.

As a brief non-limiting example of vehicle data and information, the list may include: vehicle identification number (VIN), current odometer reading, current speed, engine RPM, battery voltage, engine coolant temperature, engine coolant level, accelerator peddle position, brake peddle position, various manufacturer specific vehicle DTCs (diagnostic trouble codes), tire pressure, oil level, airbag status, seatbelt indication, emission control data, engine temperature, intake manifold pressure, transmission data, braking information, and fuel level. It is further understood that the amount and type of vehicle data and information will change from manufacturer to manufacturer and evolve with the introduction of additional vehicular technology.

The DTE telemetry microprocessor 31 is further interconnected for communication with the DCE wireless telemetry communications microprocessor 32. In an embodiment of the invention, an example of the DCE wireless telemetry communications microprocessor 32 is a Leon 100 commercially available from u-blox Corporation. The Leon 100 provides mobile communications capability and functionality to the vehicular telemetry hardware system 30 for sending and receiving data to/from a remote site 44. Alternatively, the communication device could be a satellite communication device such as an Iridium™ device interconnected for communication with the DTE telemetry microprocessor 31. Alternatively, there could be a DCE wireless telemetry communications microprocessor 32 and an Iridium™ device for satellite communication. This provides the vehicular telemetry hardware system 30 with the capability to communicate with at least one remote site 44.

In embodiments of the invention, a remote site 44 could be another vehicle 11 or a base station or a hand held device 22. The base station may include one or more servers 19 and one or more computers 20 connected through a computer network 18 (see FIG. 1). In addition, the base station may include computer application software for data acquisition, analysis, and sending/receiving commands, messages to/from the vehicular telemetry hardware system 30.

The DTE telemetry microprocessor 31 is further interconnected for communication with an accelerometer (34). An accelerometer (34) is a device that measures the physical acceleration experienced by an object. Single and multi-axis models of accelerometers are available to detect the magnitude and direction of the acceleration, or g-force, and the device may also be used to sense orientation, coordinate acceleration, vibration, shock, and falling.

In an embodiment of the invention, an example of a multi-axis accelerometer (34) is the LIS302DL MEMS Motion Sensor commercially available from STMicroelectronics. The LIS302DL integrated circuit is an ultra compact low-power three axes linear accelerometer that includes a sensing element and an IC interface able to take the information from the sensing element and to provide the measured acceleration data to other devices, such as a DTE Telemetry Microprocessor (31), through an I2C/SPI (Inter-Integrated Circuit) (Serial Peripheral Interface) serial interface. The LIS302DL integrated circuit has a user-selectable full scale range of +−2 g and +−8 g, programmable thresholds, and is capable of measuring accelerations with an output data rate of 100 Hz or 400 Hz.

The vehicular telemetry hardware system 30 receives data and information from the resident vehicular portion 42, the GPS module 33, and the accelerometer 43. The data and information is stored in non-volatile flash memory 35 as a data log. The data log may be further transmitted by the vehicular telemetry hardware system 30 over the vehicular telemetry communication system to the server 19 (see FIG. 1). The transmission may be controlled and set by the vehicular telemetry hardware system 30 at pre-defined intervals. The transmission may also be triggered as a result of a events such as a harsh event or an accident. The transmission may further be requested by a command sent from the application software running on the server 19.

Accelerometer Thresholds

In order for the accelerometer and system to monitor and determine events, the system requires a threshold, or thresholds, to indicate events such as harsh acceleration, harsh cornering, harsh breaking, or accidents. However, these thresholds depend in part upon the weight of the vehicle. A heavier vehicle would have a different accelerometer threshold from a lighter vehicle.

For example, a cargo van may weigh 2500 pounds, a cube van may weigh 5000 pounds, a straight truck may weight 15,000 pounds and a tractor-trailer may weight 80,000 pounds. Furthermore, depending upon the platform, model, configuration and options, a particular class or type of vehicle may also have a range of weights.

If the accelerometer threshold is set either too high or low for a particular vehicle weight, then the accelerometer may either over read or under read for a given event resulting in either missing an event or erroneously reporting an event.

Table 1 illustrates by way of example, a number of different thresholds relating to different aspects of a harsh event such as accelerations, braking, and cornering. There are also different sensitivities, or a graduation associated with the threshold values to include low sensitivity, medium sensitivity, and high sensitivity. These sensitivities in turn relate to a range of vehicle weights.

TABLE 1

Example thresholds for harsh events with different sensitivities.

| Aspect Of Event | Significant Event Type | Accelerometer Data | Range |
|---|---|---|---|
| High Sensitivity | Harsh Acceleration | Forward or Braking | (3.52, 90) |
| | Harsh Braking | Forward or Braking | (−90, −3.88) |
| | Harsh Corning (Left) | Side to Side | (3.88, 90) |
| | Harsh Corning (Right) | Side to Side | (−90, −3.88) |
| Medium Sensitivity | Harsh Acceleration | Forward or Braking | (4.41, 90) |
| | Harsh Braking | Forward or Braking | (−90, −4.76) |
| | Harsh Corning (Left) | Side to Side | (4.76, 90) |
| | Harsh Corning (Right) | Side to Side | (−90, −4.76) |
| Low Sensitivity | Harsh Acceleration | Forward or Braking | (5.29, 90) |
| | Harsh Braking | Forward or Braking | (−90, −5.64) |
| | Harsh Corning (Left) | Side to Side | (5.64, 90) |
| | Harsh Corning (Right) | Side to Side | (−90, −5.64) |

Therefore, as illustrated by table 1, the threshold values and sensitivity may be associated with a range of vehicle weights. In an embodiment of the invention, the accelerometer threshold values may be for a single axis accelerometer. In another embodiment of the invention, the accelerometer threshold values may be for a multi-axis accelerometer.

Vehicle Identification Number (VIN)

A vehicle identification number, or VIN, is a unique serial number used in the automotive industry to identify individual vehicles. There are a number of standards used to establish a vehicle identification number, for example ISO 3779 and ISO 3780 herein incorporated by reference. As illustrated in Table 2, an example vehicle identification number may be composed of three sections to include a world manufacturer identifier (WMI), a vehicle descriptor section (VDS), and a vehicle identifier section (VIS).

The world manufacturer identifier field has three bits (0-2) of information that identify the manufacturer of the vehicle. The first bit identifies the country where the vehicle was manufactured. For example, a 1 or 4 indicates the United States, a 2 indicates Canada, and a 3 indicates Mexico. The second bit identifies the manufacturer. For example, a "G" identifies General Motors and a "7" identifies GM Canada. The third bit identifies the vehicle type or manufacturing division.

As a further example using the first three bits, a value of "1GC" indicates a vehicle manufactured in the United States by General Motors as a vehicle type of a Chevrolet truck.

The vehicle descriptor section field has five bits of information (3-7) for identifying the vehicle type. Each manufacturer has a unique system for using the vehicle descriptor section field and it may include information on the vehicle platform, model, body style, engine type, model, or series.

The eighth bit is a check digit for identifying the accuracy of a vehicle identification number.

Within the vehicle identifier section field, bit 9 indicates the model year and bit 10 indicates the assembly plant code. The vehicle identifier section field also has eight bits of information (11-16) for identifying the individual vehicle. The information may differ from manufacturer to manufacturer and this field may include information on options installed, or engine and transmission choices.

The last four bits are numeric and identify the sequence of the vehicle for production as it rolled off the manufacturers assembly line. The last four bits uniquely identify the individual vehicle.

While the vehicle identification number has been described by way of example to standards, not all manufacturers follow standards and may have a unique composition for vehicle identification. In this case, a vehicle identification number could be analyzed to determine the composition and makeup of the number.

Vehicle Identification Number Decoding And Analysis

Figure 3:
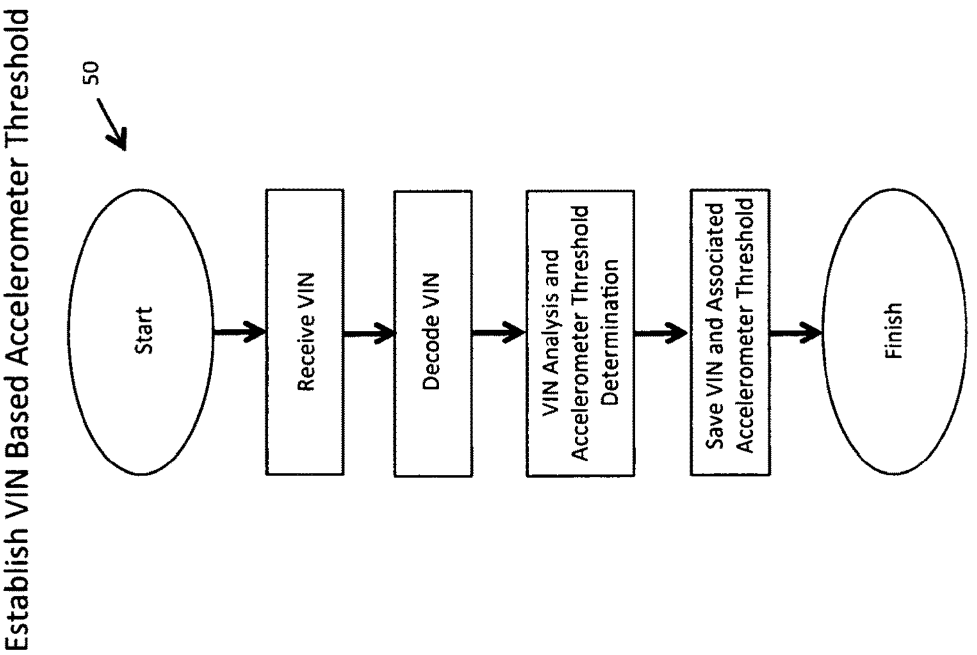
FIG. 3 is a high level flow chart for establishing a VIN based accelerometer threshold.

A non-limiting vehicle identification number decoding and analysis example will be explained with reference to Table 3 and FIG. 3. The method to establish a VIN based accelerometer threshold is generally indicated at 50. The example includes information associated with a vehicle identification number (VIN) to include a world manufacturer

TABLE 2

Composition of VIN

| Standard | 0 1 2 | 3 4 5 6 7 | 8 | 9 | 10 | 11 12 13 | 14 15 16 |
|---|---|---|---|---|---|---|---|
| ISO 3779 | WMI | VDS | | | | VIS | |
| European Union and North America more than 500 vehicles per year | WMI | Vehicle Attributes | Check Digit | Model Year | Plant Code | Sequential Number | |
| European union and North America less than 500 vehicles per year | WMI | Vehicle Attributes | Check Digit | Model Year | Plant Code | Manufacturer Identifier | Sequential Number |

identifier (WMI) field, vehicle descriptor section (VDS) field, and vehicle identifier section (VIS) field.

TABLE 3

Example Record of Vin Information.
VIN Information and Data

| | | | |
|---|---|---|---|
| WMI Field | Manufacturer | | A |
| VDS Field | Vehicle Type | Platform | P1 |
| | | | P2 |
| | | Model | M1 |
| | | | M2 |
| | | | M3 |
| | | Body Style | BS1 |
| | | | BS2 |
| | | Engine Type | E1 |
| | | | E2 |
| VIS Field | Individual Vehicle | Installed Options | OPT1 |
| | | | OPT2 |
| | | | OPT3 |
| | | | OPT4 |
| | | | OPT5 |
| | | Engine | EA |
| | | | EB |
| | | Transmission | TA |
| | | | TB |

The vehicle identification number is received and may be decoded to identify vehicle components such as various characteristics, configurations, and options of a particular vehicle. In this example, the manufacturer has two types of platform, three models, two body styles, four engines, five options, and two transmissions that may be combined to provide a particular vehicle.

Figure 5:
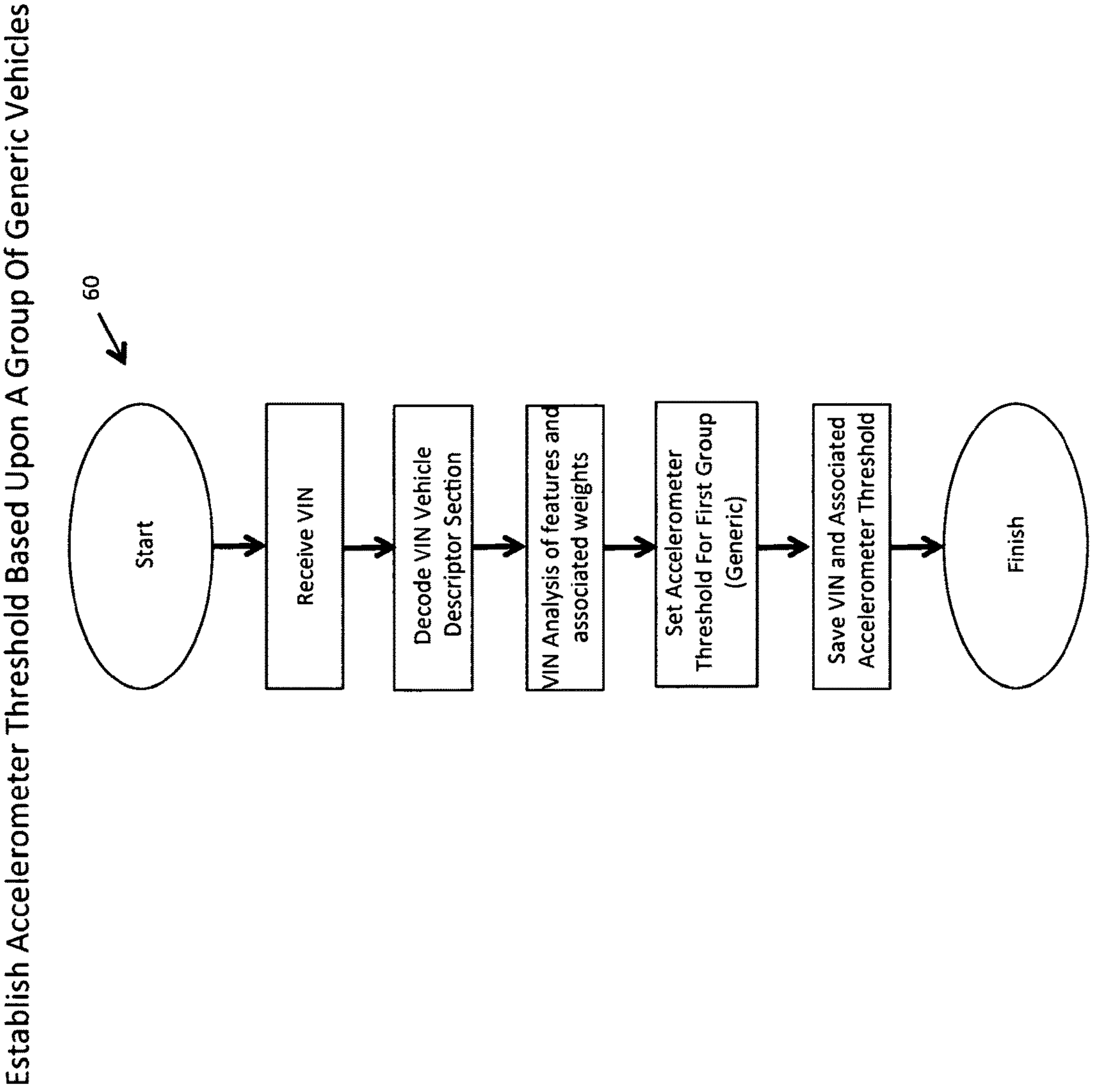
FIG. 5 is a high level flow chart for establishing a VIN based accelerometer threshold based upon a group of generic vehicles.
Figure 6:
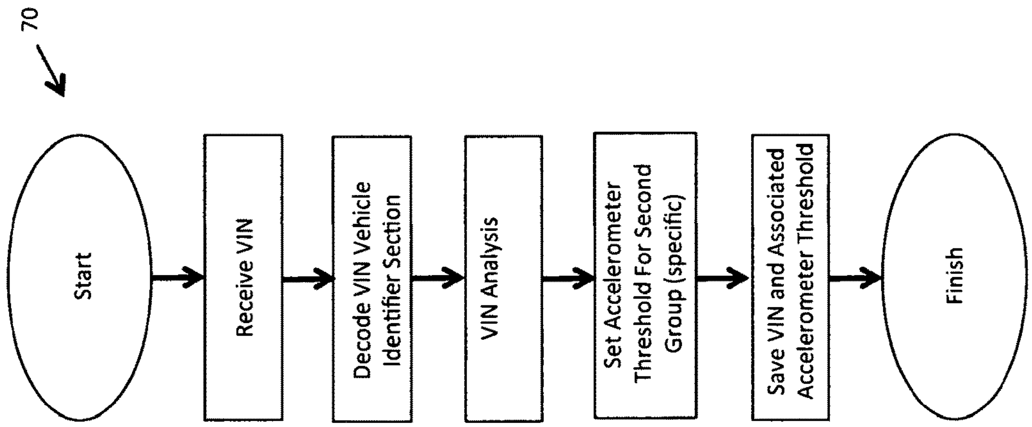
FIG. 6 is a high level flow chart for establishing a VIN based accelerometer threshold based upon a group of specific vehicles.

By way of a non-limiting example and reference to Table 3, an example VIN may be decoded as follows:

from the WMI field, to be manufacturer A, from the VDS field, Platform P2, Model M2, Body Style BS2 and Engine Type E2, from the VIS field, Installed Options OPT1 and OPT5, Engine EA and Transmission TB The decoded information from the VDS field may be provided as a first group of vehicle information (see FIG. 5, establishing accelerometer threshold based upon a group of generic vehicles is generally indicated at 60). In an embodiment of the invention, the first group of vehicle information is a generic type of vehicle for setting a generic VIN based accelerometer threshold. The decoded information from the VIS field may be provided as a second group of vehicle information (see FIG. 6, establishing accelerometer threshold based upon a group of specific vehicles is generally indicated at 70). The second group of vehicle information is a specific type of vehicle for setting a specific VIN based accelerometer threshold. In another embodiment of the invention, the decoded information is provided as a third group of vehicle information including both the first and second group of information.

The vehicle identification number analysis and accelerometer threshold determination may occur in a number of ways. In an embodiment of the invention, weight or mass of the vehicle and each vehicle components could be used. A basic weight of the vehicle could be determined from the vehicle identification number by associating individual weights with the individual vehicle components such as platform, model, body style, engine type, transmission type, and installed options. Then, by adding up the component weights based upon a decoded vehicle identification number for the particular vehicle, you calculate a basic weight of the vehicle. The basic weight of the vehicle could be a first group basic weight, a second group basic weight, or a third group basic weight.

Once a basic weight of the vehicle has been determined, than an associated, or assigned VIN based accelerometer threshold may be determined based upon the basic weight of the vehicle for example, assigning a medium sensitivity set of thresholds (see Table 1).

In another embodiment of the invention, accelerometer thresholds could be directly assigned for configurations of the vehicle identification number. For example, a known accelerometer threshold for a known vehicle could be assigned to the vehicle identification number as a VIN based accelerometer threshold. Then, the vehicle identification number could be decoded into the vehicle components to associate the vehicle components with the accelerometer threshold.

Once a VIN based accelerometer threshold is assigned to a vehicle identification number, then this VIN based accelerometer threshold could be used for all vehicles with a first group of vehicle information (generic). Alternatively, a unique VIN based accelerometer threshold could be assigned to a vehicle with a second group of vehicle information (specific).

Once the vehicle identification number has been decoded, analyzed, and a VIN based accelerometer threshold has been assigned, the information may be saved as a digital record for future or subsequent use as VIN data and information. The VIN data and information digital record may include the vehicle identification number, corresponding weights for vehicle components, group (first, second, third), and the VIN based accelerometer threshold or refined VIN based accelerometer threshold (to be described). The digital record may be stored on a server 19, in a database 21, a computer 20 a hand held device 22, or a vehicular telemetry hardware system 30.

Figure 4:
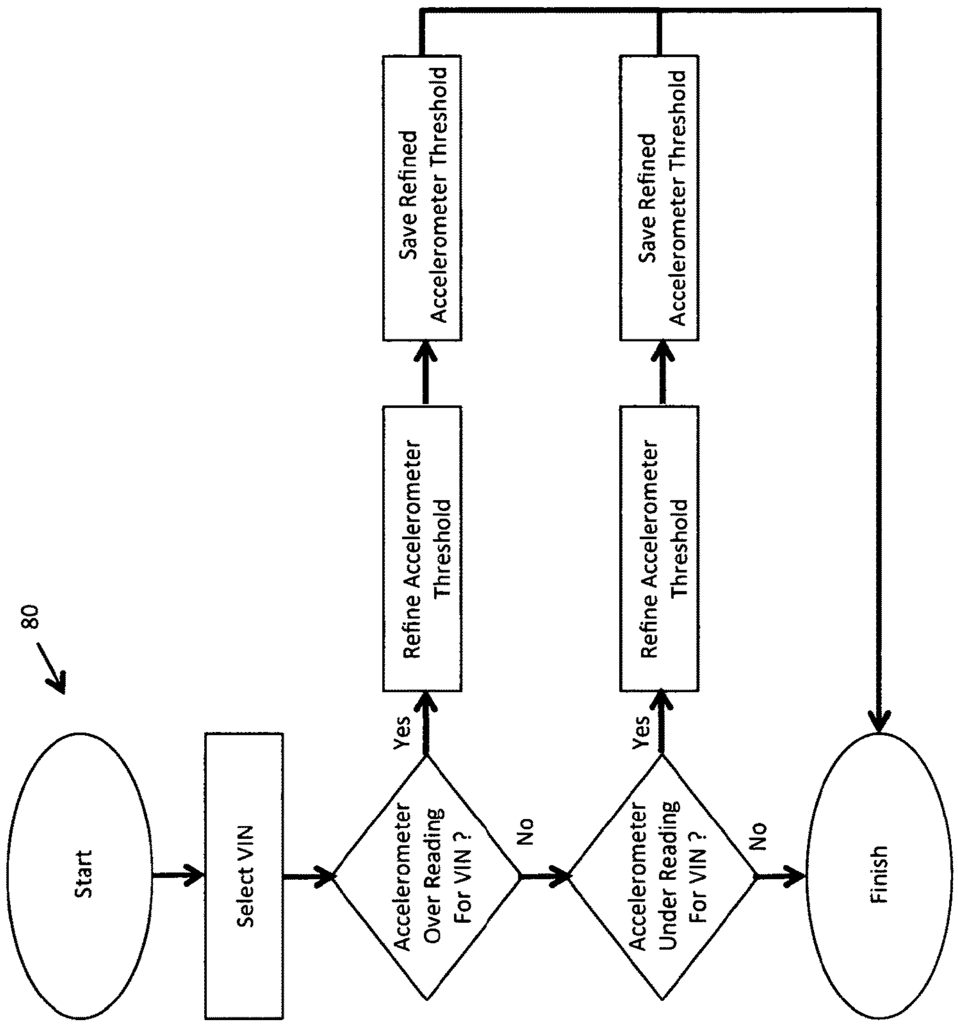
FIG. 4 is a high level flow chart for refining a VIN based accelerometer threshold

Refining or adjusting the VIN based accelerometer threshold is described with reference to FIG. 4 and generally indicated at 80. A VIN based accelerometer threshold has been assigned to a vehicle identification number and saved as a digital record. The vehicle identification number is selected and the digital record is retrieved.

For the case where the VIN based accelerometer threshold has been determined to be over reading giving erroneous indications of events, the VIN based accelerometer threshold is refined or adjusted in sensitivity (see table 1) and the new value (or values) is saved with the digital record. For the case where the VIN based accelerometer threshold has been determined to be under reading giving erroneous indications of events, the VIN based accelerometer threshold is refined or adjusted in sensitivity as well (see table 1) and the new value (or values) is saved with the digital record.

In addition, where the VIN based accelerometer threshold relates to a first group or generic type of vehicle, then application software could perform an additional digital record update of VIN based accelerometer thresholds to all vehicle identification numbers in the first group. Alternatively if there is a fleet of identical specific vehicles, then application software could perform an additional digital record update of VIN based accelerometer thresholds to all vehicle identification numbers in the second group.

Setting A VIN Based Accelerometer Threshold

The DTE telemetry microprocessor 31, firmware computer program, and memory 35 include the instructions, logic, and control to execute the portions of the method that relate to the vehicular telemetry hardware system 30. The microprocessor, application program, and memory on the server 19, or the computer, or the hand held device 22 include the instructions, logic, and control to execute the portions of the method that relate to the remote site 44. The server 19 also includes access to a database 21. The database 21 includes a plurality of digital records of VIN data and information.

Figure 7:
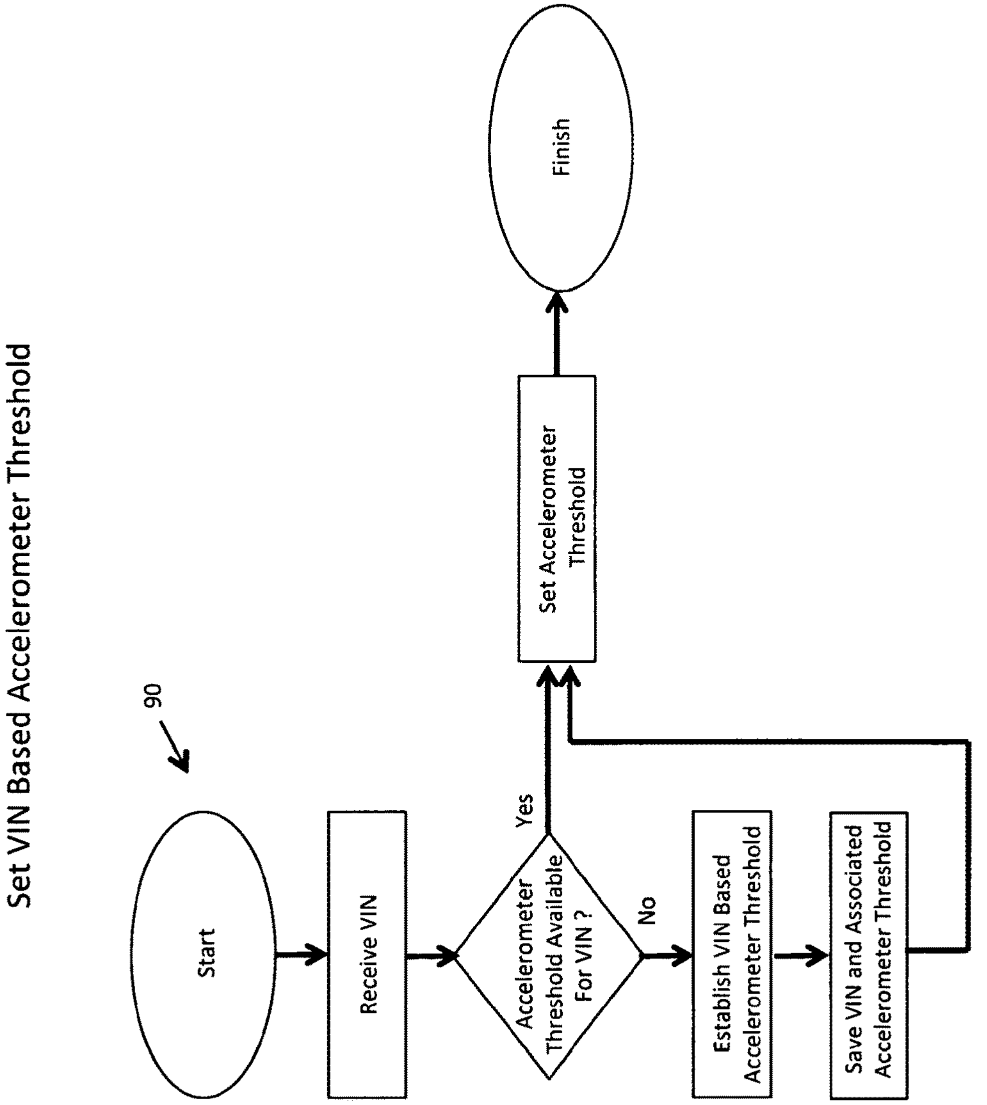
FIG. 7 is a high level flow chart for setting a VIN based accelerometer threshold.

Referring now to FIGS. 1 and 7, an embodiment of the invention is described to set a VIN based accelerometer threshold.

The vehicular telemetry hardware system 30 makes a request to the resident vehicular portion 42 and receives the vehicle identification number. The vehicular telemetry hardware system 30 creates a message with the vehicle identification number and sends the message to a remote site 44 over the telematic communications network. In this example, the remote site 44 is a server 19 that receives the message. Application software on the server 19 decodes the message to extract the vehicle identification number. The vehicle identification number is checked with the database of digital records to determine if a VIN based accelerometer threshold is available for the vehicle identification number data.

If a VIN based accelerometer threshold is in the database, then the server 19 creates a message with the VIN based accelerometer threshold and sends the message to the vehicular telemetry system 30. The vehicular telemetry hardware system 30 receives the message and decodes the message to extract the VIN based accelerometer threshold. The vehicular telemetry hardware system 30 sets the accelerometer threshold.

If a VIN based accelerometer threshold is not in the database, the application software on the server 19 determines a VIN based accelerometer threshold for the vehicle identification number. The vehicle identification number is decoded and analyzed and a VIN based accelerometer threshold is determined as previously described and a digital record is created. The server 19 creates a message with the VIN based accelerometer threshold and sends this message over the telematics communication system to the vehicular telemetry hardware system 30. The vehicular telemetry hardware system 30 receives the message and decodes the message to extract the VIN based accelerometer threshold data and sets the accelerometer threshold.

Alternatively, the remote site could be a computer 20 for decoding and analyzing the vehicle identification number and determining a VIN based accelerometer threshold.

Alternatively, the remote site could be a hand held device 22 for decoding and analyzing the vehicle identification number and determining a VIN based accelerometer threshold.

Alternatively, the decoding and analyzing of the vehicle identification number and determining a VIN based accelerometer threshold could be accomplished to the vehicular telemetry hardware system 30. In this case, the vehicle identification number and associated VIN based accelerometer threshold would be sent as a message to a remote site 44 for saving the digital record.

On Board Initiated Request VIN Based Accelerometer Threshold

Figure 8:
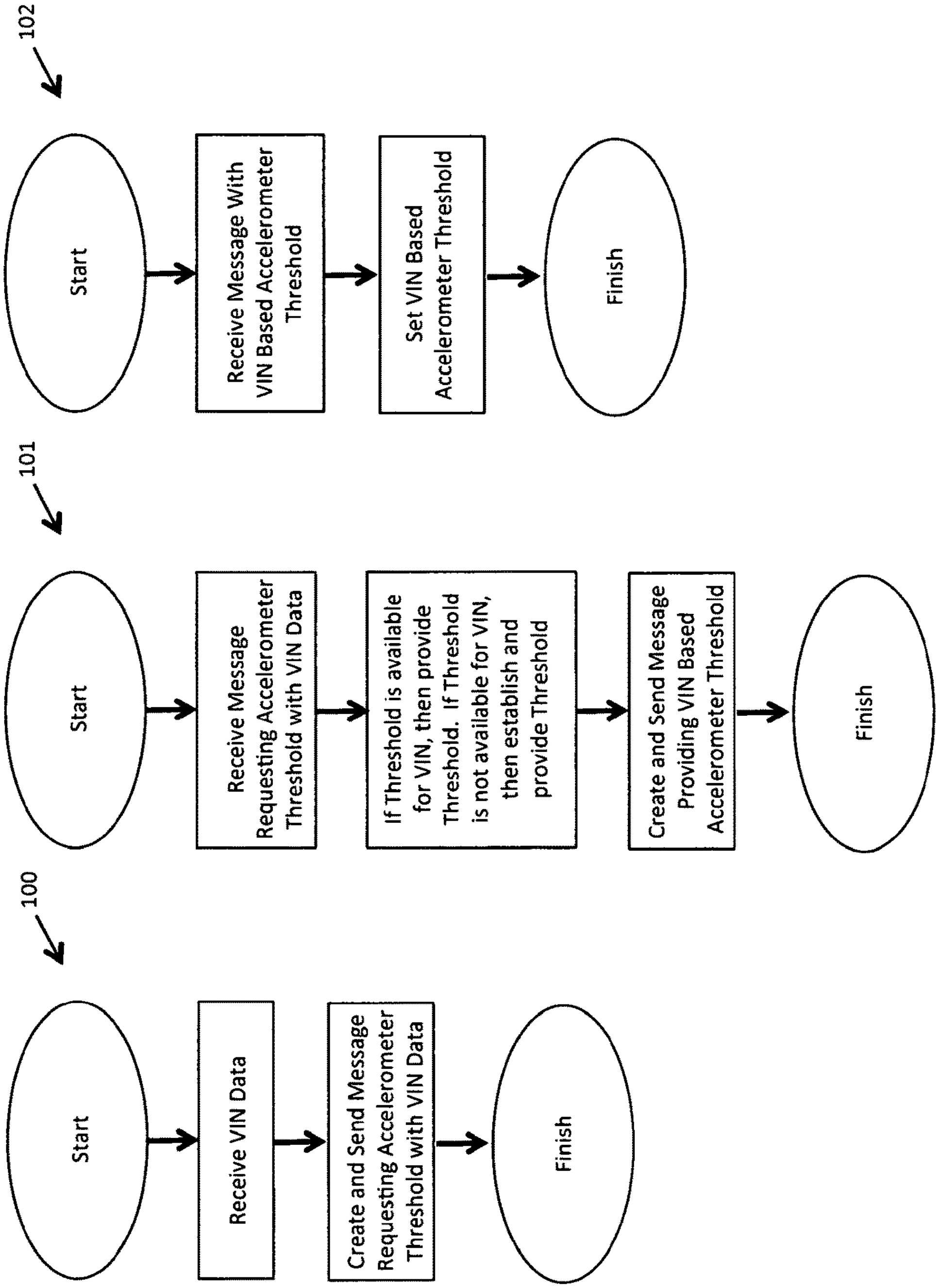
FIG. 8 is a high level flow chart for a vehicular telemetry hardware system on-board portion initiated request for a VIN based accelerometer threshold.

Referring now to FIGS. 1, 2, and 8, an on board initiated request for a VIN based accelerometer threshold is described.

The request is generally indicated at 100. The vehicular telemetry hardware system 30 receives vehicle identification number data over the interface 36 and connection 43 to the vehicle network communications bus 37. The vehicular telemetry hardware system 30 creates a message with the vehicle identification number data and sends the message to a remote site 44 requesting an accelerometer threshold.

The VIN based accelerometer threshold determination is generally indicated at 101. The remote site 44 receives the message and decodes the message to extract the vehicle identification number data. If a threshold is available for the vehicle identification number, it will be provided to the vehicular telemetry hardware system 30. If a threshold is not available, it will be determined as previously described. The remote site 44 creates a message with the VIN based accelerometer threshold and sends the message to the vehicular telemetry hardware system 30.

Setting the VIN based accelerometer threshold is generally indicated at 102. The vehicular telemetry hardware system 30 receives the message and decodes the message to extract the VIN based accelerometer threshold. The vehicular telemetry hardware system sets the accelerometer threshold.

Remote Initiated Set VIN Based Accelerometer Threshold

Figure 9:
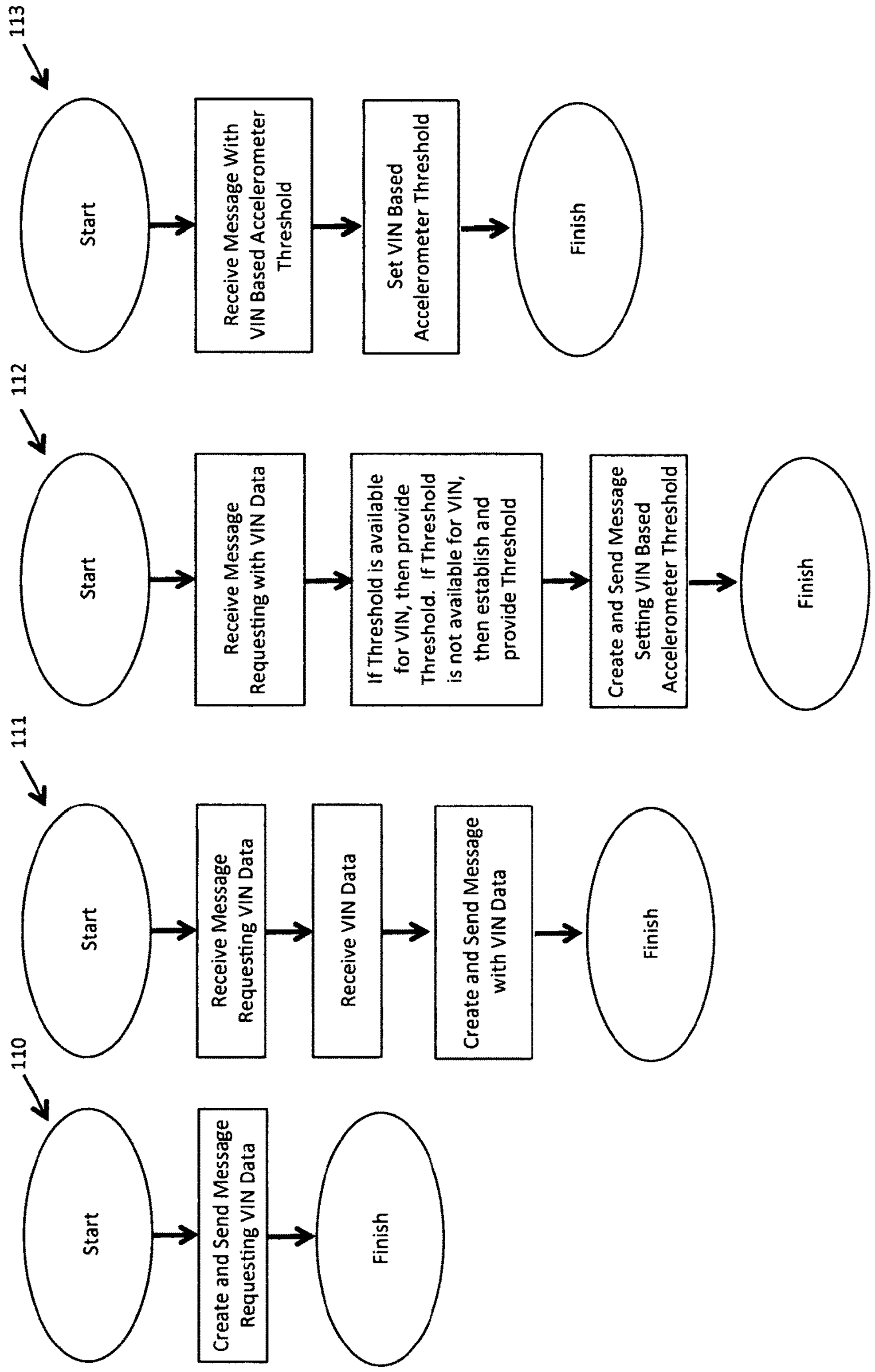
FIG. 9 is a high level flow chart for a remote initiated request to set a VIN based accelerometer threshold.

Referring now to FIGS. 1, 2, and 9, an remote initiated request for a VIN based accelerometer threshold is described.

The remote request for a vehicle identification number is generally indicated at 110. The remote site 44 creates and sends a message requesting the vehicle identification number to the vehicular telemetry hardware system 30.

Sending the vehicle identification number is generally indicated at 111. The vehicular hardware system 30 receives the message requesting the vehicle identification number and receives from the interface 36, connection 43 and vehicle network communications bus 37 the vehicle identification number data. The vehicular hardware system 30 creates a message with the vehicle identification number and sends the message to the remote site 44.

The VIN based accelerometer threshold determination is generally indicated at 102. The remote site 44 receives the message and decodes the message to extract the vehicle identification number data. If a threshold is available for the vehicle identification number, it will be provided to the vehicular telemetry hardware system 30. If a threshold is not available, it will be determined as previously described. The remote site 44 creates a message with the VIN based accelerometer threshold and sends the message to the vehicular telemetry hardware system 30.

Setting the VIN based accelerometer threshold is generally indicated at 113. The vehicular telemetry hardware system 30 receives the message and decodes the message to extract the VIN based accelerometer threshold. The vehicular telemetry hardware system sets the accelerometer threshold.

The remote initiated set VIN based accelerometer threshold may also be used in the case there the threshold has been refined to correct for either over reading or under reading providing erroneous indications of events.

Once the VIN based accelerometer threshold has been set in the vehicular telemetry hardware system 30, the DTE telemetry microprocessor 31 and firmware monitor the data from the accelerometer 34 and compare the data with the VIN based accelerometer threshold to detect and report events to the remote site 44. Alternatively, the data is logged in the system and assessed remotely at the remote site 44

Embodiments of the present invention provide one or more technical effects. More specifically, the ability for acquisition of a VIN by a vehicular telemetry hardware system to determinate a VIN based accelerometer threshold. The ability to receive and store a threshold value in a vehicular telemetry hardware system and the ability to detect an event or accident based upon a threshold value. Threshold values determined upon a VIN. Threshold values determined upon weight of a vehicle as determined by decoding the VIN. Decoding a VIN into vehicle components and associating weights with each of the vehicle components.

While the present invention has been described with respect to the non-limiting embodiments, it is to be understood that the invention is not limited to the disclosed embodiments. Persons skilled in the art understand that the disclosed invention is intended to cover various modifications and equivalent arrangements included within the scope of the appended claims. Thus, the present invention should not be limited by any of the described embodiments.

What is claimed is:

1. A vehicular telemetry system comprising:

a microprocessor configured to receive, from a vehicle network communications bus via a vehicle network communications bus interface, information relating to a type of vehicle to which the vehicular telemetry system is connected and configured to determine an acceleration threshold for the vehicle based on the information relating to the type of vehicle to which the vehicular telemetry system is connected.

2. The system as in claim 1, wherein the microprocessor is configured to one of: a) compare accelerometer data to the acceleration threshold to indicate an event, and b) send the accelerometer data to a remote server, wherein the remote server indicates the event.

3. The system as in claim 2, wherein the event indication is at least one of harsh acceleration, harsh braking, harsh cornering or accident.

4. The system as in claim 2, wherein the accelerometer data is at least one of forward acceleration data, braking acceleration data or side to side accelerometer data.

5. The system as in claim 2, wherein the event indication includes a sensitivity.

6. The system as in claim 5, wherein the sensitivity is one of high sensitivity, medium sensitivity, and low sensitivity.

7. The system as in claim 6, wherein the microprocessor is configured to adjust the sensitivity of the accelerometer threshold to correct erroneous indications of events.

8. The system as in claim 6, in combination with a remote server, wherein the remote server is configured to adjust the sensitivity of the accelerometer threshold to correct erroneous indications of events.

9. The system as in claim 2, wherein the microprocessor is configured to adjust the accelerometer threshold to correct erroneous indications of events.

10. The system as in claim 1, wherein an accelerometer threshold is set for each axis of a multi-axis accelerometer.

11. The system as in claim 1, wherein the information relating to a type of vehicle to which the vehicular telemetry system is connected comprises a vehicle identification number (VIN).

12. A system comprising:

a remote server; and a vehicle telematics system configured to send, from a vehicle network communications bus, information relating to a type of vehicle to which the vehicular telemetry system is connected to the remote server, wherein the remote server is configured to determine an acceleration threshold for the vehicle based on the received information.

13. The system as in claim 12, wherein the remote server is configured to receive accelerometer data from the vehicle and configured to compare the accelerometer data to the acceleration threshold to indicate an event.

14. The system as in claim 13, wherein the event indication is at least one of harsh acceleration, harsh braking, harsh cornering or accident.

15. The system as in claim 13, wherein the accelerometer data is at least one of forward acceleration data, braking acceleration data or side to side accelerometer data.

16. The system as in claim 13, wherein the event indication includes a sensitivity.

17. The system as in claim 16, wherein the sensitivity is one of high sensitivity, medium sensitivity, and low sensitivity.

18. The system as in claim 13, wherein the remote server is configured to adjust the accelerometer threshold to correct erroneous indications of events.

19. The system as in claim 13, wherein the remote server is configured to adjust the sensitivity of the accelerometer threshold to correct erroneous indications of events.

20. The system as in claim 12, wherein an accelerometer threshold is set for each axis of a multi-axis accelerometer.

21. The system as in claim 12, wherein the information relating to a type of vehicle to which the vehicular telemetry system is connected comprises a vehicle identification number (VIN).

22. A vehicle telematic communication system comprising:

a remote server configured to:

communicate with a vehicle;

receive, from a vehicle network communications bus in the vehicle, information relating to a type of the vehicle; and determine an acceleration threshold for the vehicle based on the received information relating to the type of the vehicle.

23. The system as in claim 22, wherein the remote server is configured to receive accelerometer data from the vehicle and configured to compare the accelerometer data to the acceleration threshold to indicate an event.

24. The system as in claim 23, wherein the event indication is at least one of harsh acceleration, harsh braking, harsh cornering or accident.

25. The system as in claim 23, wherein the accelerometer data is at least one of forward acceleration data, braking acceleration data or side to side accelerometer data.

26. The system as in claim 23, wherein the event indication includes a sensitivity.

27. The system as in claim 26, wherein the sensitivity is one of high sensitivity, medium sensitivity, and low sensitivity.

28. The system as in claim 23, wherein the remote server is configured to adjust the accelerometer threshold to correct erroneous indications of events.

29. The system as in claim 23, wherein the remote server is configured to adjust the sensitivity of the accelerometer threshold to correct erroneous indications of events.

30. The system as in claim 22, wherein an accelerometer threshold is set for each axis of a multi-axis accelerometer.

31. The system as in claim 22, wherein the information relating to a type of vehicle to which the vehicular telemetry system is connected comprises a vehicle identification number (VIN).

* * * * *